Oct. 14, 1952 R. G. PIETY 2,614,166
METHOD FOR DETERMINING THE DIRECTION OF ARRIVAL OF WAVES
Filed April 24, 1950 3 Sheets-Sheet 1

INVENTOR.
R. G. PIETY
BY Hudson & Young
ATTORNEYS

INVENTOR.
R.G. PIETY
BY Hudson & Young
ATTORNEYS

Oct. 14, 1952     R. G. PIETY     2,614,166
METHOD FOR DETERMINING THE DIRECTION OF ARRIVAL OF WAVES
Filed April 24, 1950     3 Sheets-Sheet 3

INVENTOR.
R.G. PIETY
BY
Hudson & Young
ATTORNEYS

Patented Oct. 14, 1952

2,614,166

UNITED STATES PATENT OFFICE 2,614,166

METHOD FOR DETERMINING THE DIRECTION OF ARRIVAL OF WAVES

Raymond G. Piety, Bartlesville, Okla., assignor to Phillips Petroleum Company, a corporation of Delaware Application April 24, 1950, Serial No. 157,771

12 Claims. (Cl. 177—352)

This invention relates to a method of and apparatus for determining the direction of arrival of waves traversing an elastic medium. In one specific aspect, it relates to a method of and apparatus for determining the direction of arrival of seismic waves. In another specific aspect, it relates to a method of and apparatus for determining the plane of polarization of seismic shear waves.

In seismic prospecting, an explosive charge is detonated at a shot point, thus setting up seismic waves which penetrate subterranean strata, a portion of the waves thus produced being reflected by the various subterranean formations to the surface where they are picked up by one or a plurality of seismometers. Heretofore, it has generally been assumed that the angle of incidence of the waves upon the formations was equal to the angle of reflection therefrom, as a result of which the depth of the formation producing a reflection could be calculated by simple triangulation. In many cases, however, this assumption is not justified and leads to serious error in determining the depth and location of the formation of interest. Moreover, it has been assumed that the waves are propagated through a vertical plane defined by the shot point and seismometer. This assumption is oftentime erroneous and can also lead to serious errors in determining the depth and location of subterranean formations.

It is an object of my invention to provide a simple, reliable device for accurately determining the direction of arrival of seismic waves at a seismometer.

It is a further object to provide such apparatus for determining the vertical angle at which the waves arrive or, alternatively, to determine the horizontal angle of arrival.

It is a still further object to provide apparatus for determining the direction of arrival in space of seismic waves at a seismometer station.

It is a still further object to provide apparatus for determining the direction of polarization of shear waves received at a seismometer station.

It is a still further object to provide apparatus of general utility for determining the direction of arrival at a selected location of waves propagated through an elastic medium.

Various other objects, advantages and features of the invention will become apparent from the following detailed description taken in conjunction with the accompanying drawings, in which.

Figure 1:
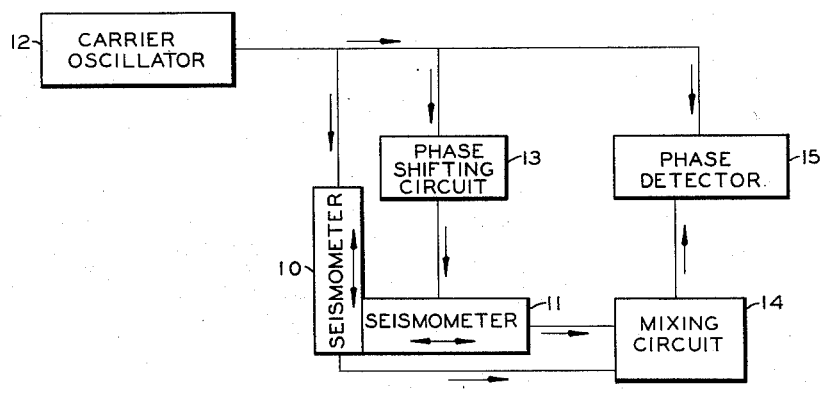
Figure 1 is a block diagram of apparatus for measuring the direction of arrival of waves in a preselected plane.

Referring now to Figure 1 seismometers 10 and 11 or other suitable wave detectors are disposed so that they are sensitive to waves arriving in different directions. Preferably, the seismometers are positioned so that their axes of sensitivity are mutually perpendicular although, as will be explained later, this is not necessarily true. If it is desired to measure the horizontal angle of arrival of the waves, the seismometers are located so that they are responsive only to signals propagated in a horizontal plane, and the direction of arrival is then determined with respect to the axis of sensitivity of seismometer 10, for example, or any other desired reference line, such as the line connecting the shot point and seismometer station. If it is desired to measure the vertical angle of arrival of the waves, one of the seismometers 10 is positioned with its axis of sensitivity extending in a vertical direction while the other seismometer is positioned with its axis of sensitivity extending in a horizontal direction. The apparatus of my invention then measures the angle at which the waves arrive with respect to the horizontal plane defined by the earth's surface.

Figure 6:
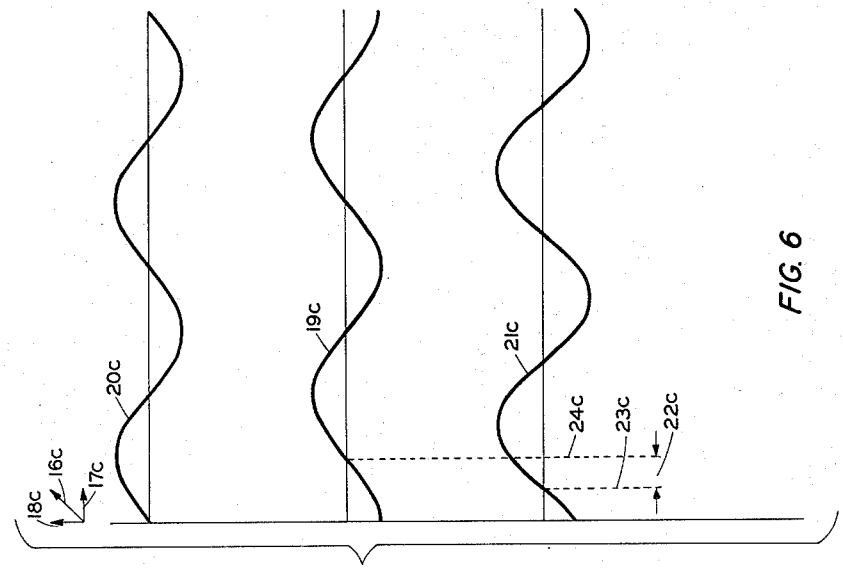

The seismometers 10, 11 are preferably of the modulator type and may be magnetic, capacitative of any other suitable form of seismometer. That is, the seismic signals impressed upon the seismometers are caused to modulate an alternating carrier wave. Such a seismometer is shown in the copending application of Piety and Thomas, Serial No. 27,594, filed May 17, 1948, entitled Seismometer. In Figure 6 of the disclosure, alternating current is supplied to the magnetic field structure of the seismometer, thus producing a modulated signal of the suppressed carrier type. That is, there is no carrier voltage when no seismic signal is present. This type of wave may be considered to be an envelope defined by the modulating signal or seismic wave, this envelope determining the amplitude of the alternating carrier voltage which, in effect, is enclosed within the envelope. However, ordinary amplitude modulated signals may be utilized in accordance with my invention or a conventional seismometer may be utilized and its output used to generate a suppressed carrier amplitude modulated voltage. In Figure 1, the carrier voltage is supplied by an oscillator 12, which voltage is fed directly to the modulating portion of seismometer 10. The carriage voltage is also fed through a phase shifting circuit 13 to the modulating portion of seismometer 11. Preferably, the circuit 13 produces a phase shift of ninety degrees, although phase shifts other than ninety degrees may be utilized in some cases. The modulated outputs of the seismometers 10, 11 are fed to a mixing circuit 14, the resultant voltage, consisting of the algebraic sum of the seismometer output voltages, being fed to a phase detector 15 which determines and indicates the phase angle between said resultant voltage and the voltage produced by carrier oscillator 12. This phase angle directly indicates the direction of arrival of the seismic waves at seismometers 10, 11.

Figure 4:
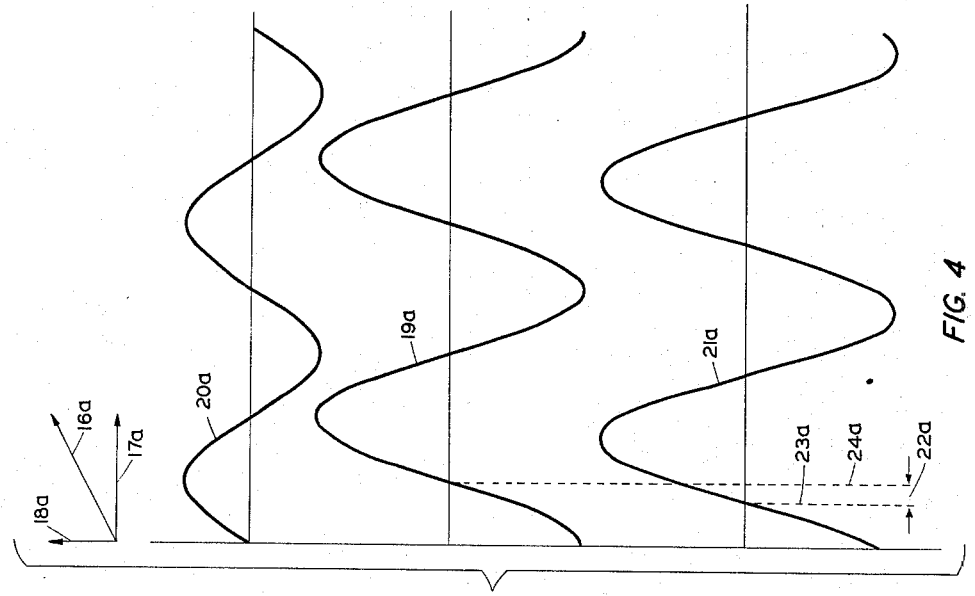
Figures 3 to 6, inclusive, are graphs illustrating the manner in which my invention is carried out.
Figure 3:
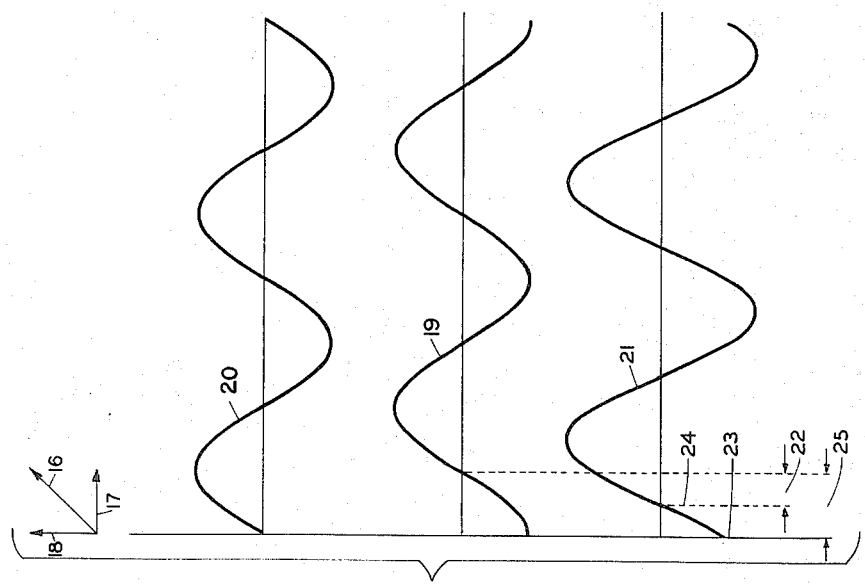
Figure 5:
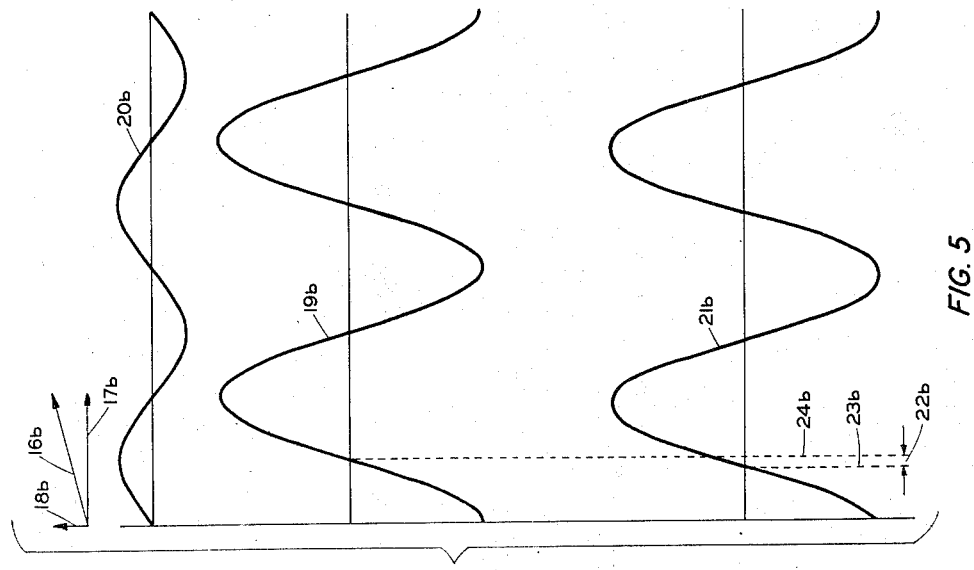

The operation of the circuit of Figure 1 may be better understood from a consideration of the graphs, Figures 3 to 6, inclusive. In Figure 3, vector 16 represents the magnitude and direction of arrival of the wave to be measured while vectors 17, 18 represent the mutually perpendicular components of vector 16 in the plane in which the direction of arrival is to be measured. For purposes of simplicity, it is assumed that there is no change in the magnitude nor direction of arrival of the wave during the period under discussion, although such variations in direction and magnitude do not affect the functioning of the apparatus. In the present example, it is assumed that the vector 16 is at an angle of forty-five degrees with respect to the components 17 and 18. Responsive to the seismic wave represented by vector 16, modulator type seismometer 10 produces a sinusoidal output represented by curve 19, the frequency of which is determined by carrier oscillator 12 and the amplitude of which is proportional to the magnitude of component 18 of the seismic wave represented by vector 16. In similar fashion, seismometer 11 produces a voltage wave 20, the frequency of which is determined by that of oscillator 12, and the amplitude of which is proportional to the magnitude of component 17 of the seismic wave. Due to the action of phase shifting circuit 13, however, there is a phase difference of ninety degrees between curves 19 and 20. These two waves are added algebraically in mixing circuit 14 to produce a resultant wave 21 which is fed to phase detector 15. This detector measures the phase difference between the curves 19 and 21 which may be represented by the distance 22 between the point 23 at which curve 19 intersects the axis and the point 24 at which curve 21 intersects the axis. It will be noted that the distance 25 represents one-quarter cycle or ninety degrees of an oscillation produced by the unit 12 and that the distance 22 is one-half the distance 25. That is, the distance 22 represents one-eighth of a cycle or forty-five degrees which is the angle between component 17 and the vector 16. The angle between vectors 16, 17 is thus transformed into a phase variation proportional thereto which is indicated directly by detector 15. The graphs of Figures 4, 5 and 6 are arranged in the same manner as Figure 3 and similar parts are indicated by like reference characters with different letters.

The vectors 16a and 16c represent two seismic waves having the same direction of arrival but different magnitudes. It will be noted, however, that the distances 22a and 22c representing the angle between component 17 and vector 16 in the two figures is exactly the same. Accordingly, the angle read by the phase detector 15 is not influenced by variations in magnitude of the signal. It will be apparent, therefore, that the circuit of Figure 1 is not restricted to steady signals but indicates the angle of arrival of the waves despite variations in their magnitude. It will be further noted that the angle between vector 16a and component 17a is slightly more than one-half the angle between vector 16 and vector 17 while, likewise, the distance 22a is slightly more than one-half the distance 22.

The vector 16b represents a seismic wave of the same magnitude as that represented by vector 16a but having a different direction of arrival. It will be seen that the distance 22b is extremely small corresponding to the small angle between vector 16b and component 17b.

It will be apparent, therefore, that I have provided apparatus for accurately determining the direction of arrival of seismic waves or other waves propagated through an elastic medium, the direction of arrival being determined with respect to a reference line in a preselected plane. It will also be evident that the components need not necessarily be taken in mutually perpendicular directions, although it is much more convenient to utilize mutually perpendicular components. By suitable calibration, the direction of arrival may be determined when there is any desired angle between the seismometers or other wave-responsive units. Similarly, where the phase shifting circuit 13 shifts the oscillator signal through a phase angle of other than ninety degrees, the same results may be obtained although the calibration of the instrument is made more difficult and some computation may be required to take into account the phase shift angle. It is to be understood, therefore, that I consider the apparatus of my invention applicable to the use of a phase shift angle other than ninety degrees and to the arrangement of the seismometers or other wave detector units in directions other than mutually perpendicular directions.

Ordinarily, the seismometers 10, 11 measure translational or dilatational earth movements, in which case the phase detector 15 produces an output representative of the angular displacement of the direction of arrival of the waves from a reference line, such as that of the vector components 17 in Figures 3 to 6, inclusive. However, the invention is also applicable where the seismometers 10, 11 measure rotational earth movements instead of translational or dilatational earth movements. A suitable modulator type rotational seismometer for this purpose is disclosed in my copending application Serial No. 22,191, filed April 30, 1948, entitled Rotational Geophone. When rotational seismometers are utilized, the output of the phase detector unit is a measure of the direction of polarization of the seismometer shear waves traversing the subterranean strata, the direction of polarization being measured with respect to a reference plane established by the proper positioning of the seismometer units.

Figure 2:
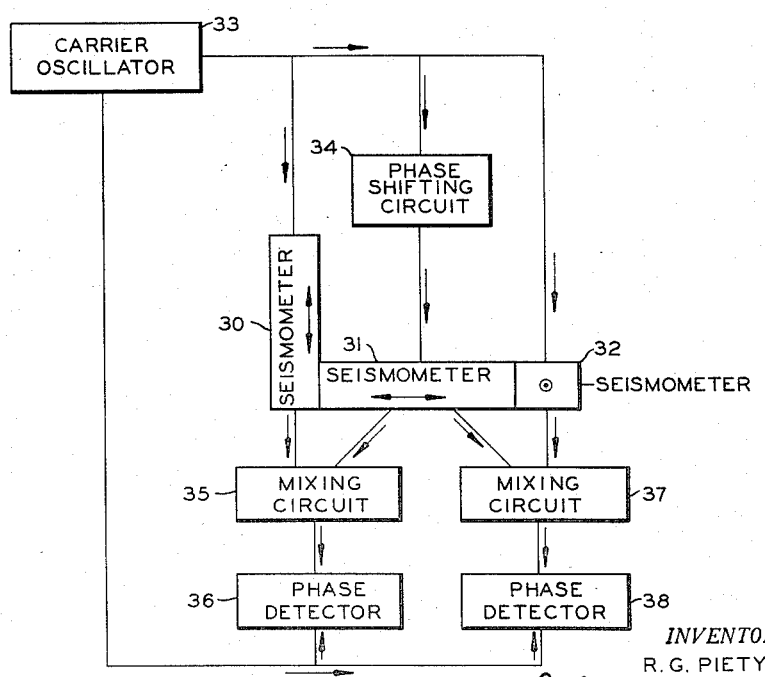
Figure 2 is a block diagram of apparatus for measuring the direction of arrival in space of waves propagated through an elastic medium.

The apparatus of my invention is also suitable for determining the direction of arrival in space of a seismic wave or other wave disturbances propagated through an elastic medium. A circuit for this purpose is shown by Figure 2 wherein seismometers 30, 31, and 32 have their axes of sensitivity oriented in three different directions, preferably in three mutually perpendicular directions, as shown on the figure, in which seismometers 30 and 31 are positioned with their axes in the surface plane while seismometer 32 has its axis of sensitivity disposed in a vertical direction. An alternating voltage from a carrier oscillator 33 is fed directly to seismometers 30 and 32, and through a phase shifting circuit 34 to seismometer 31, the circuit 34 preferably producing a phase shift of ninety degrees in the carrier voltage.

The output of seismometers 30, 31 is combined in a mixing circuit 35 which, in turn, feeds a phase detector 36 for comparing the phase of the voltage from the mixing circuit with the phase of the oscillator voltage. In similar fashion, the output of seismometers 31, 32 is combined in a mixing circuit 37, the output of which is fed to a phase detector 38 which determines the difference in phase between the output voltage of mixing circuit 37 and the carrier voltage produced by oscillator 33. Thus, there are, in effect, two separate circuits of the type illustrated in Figure 1. In one such circuit, phase detector 36 indicates the direction of arrival of the wave in the horizontal plane defined by the sensitivity axes of seismometers 30 and 31, while phase detector 38 determines the direction of arrival of the wave in the vertical plane defined by the axes of sensitivity of seismometers 31 and 32. From these data, the direction of arrival of the wave in space, that is, three dimensionally, can be readily calculated. It will be apparent, therefore, that I have attained the objects of my invention in providing a simple, reliable apparatus for determining the direction of arrival of waves, such as seismic waves, propagated through an elastic medium, the arrival direction being determined either in space by the apparatus of Figure 2 or with respect to a reference line in a preselected plane, as in the apparatus of Figure 1.

While the invention has been described in connection with a present, preferred embodiment thereof, it is to be understood that this description is illustrative only and is not intended to limit the invention, the scope of which is defined by the appended claims.

I claim:

1. Apparatus for determining the direction of arrival of waves in a preselected reference plane which comprises, in combination, a pair of wave detector units oriented to receive waves approaching from different directions in the reference plane, means for producing an alternating carrier voltage, means for modulating said voltage with the output of one of said detector units, means for shifting the phase of the carrier voltage, means for modulating the output of said second detector unit with the phase shifted voltage, means for combining said modulated voltages to produce a resultant voltage, and means for determining the relative phase of said carrier voltage and said resultant voltage.

2. Apparatus for determining the direction of arrival of seismic waves in a preselected reference plane which comprises, in combination, a pair of seismometers having their axes of sensitivity oriented in different directions in said reference plane, means for producing an alternating carrier voltage, means for modulating said voltage with the output of one of said seismometers, means for shifting the phase of the carrier voltage, means for modulating the phase shifted carrier voltage with the output of the other of said seismometer, means for combining the modulated voltages to produce a resultant voltage, and means for determining the phase of said resultant voltage.

3. Apparatus constructed in accordance with claim 2 in which the seismometers are responsive to translational earth movements and not to rotational earth movements.

4. Apparatus constructed in accordance with claim 2 in which the seismometers are responsive to rotational earth movements and not to translational earth movements.

5. Apparatus for determining the direction of arrival of seismic waves in a reference plane which comprises, in combination, a pair of seismometers having their axes of sensitivity oriented in mutually perpendicular directions within said reference plane, means for producing an alternating carrier voltage, means for modulating said voltage with the output of one of said seismometers, a circuit for producing a phase shift of ninety degrees in said carrier voltage, means for modulating said phase shifted voltage with the output of the other of said seismometers, a mixing circuit for combining the said modulated voltages to produce a resultant voltage, and a phase detector for determining the phase of said resultant voltage with respect to said carrier voltage.

6. Apparatus in accordance with claim 5 in which the reference plane is a horizontal plane.

7. Apparatus in accordance with claim 5 in which the reference plane is a vertical plane.

8. Apparatus for determining the direction of arrival of seismic waves in a reference plane which comprises, in combination, a pair of rotational seismometers having their axes of sensitivity oriented in mutually perpendicular directions within said reference plane, means for producing an alternating carrier voltage, means for modulating said voltage with the output of one of said rotational seismometers, a circuit for producing a phase shift of ninety degrees in said carrier voltage, means for modulating said phase shifted voltage with the output of the other of said rotational seismometers, a mixing circuit for combining the said modulated voltages to produce a resultant voltage, and a phase detector for determining the phase of said resultant voltage with respect to said carrier voltage.

9. Apparatus for determining the direction of arrival in space of a wave propagated through an elastic medium which comprises, in combination, three wave detector units oriented to receive waves traversing said medium in three different directions, means for producing an alternating carrier voltage, means for modulating said carrier voltage with the output of two detector units, means for shifting the phase of said alternating carrier voltage, means for modulating the phase shifted voltage with the output of the third detector unit, means for combining the modulated voltage from the third detector unit with the output of one of said two detector units to produce a first resultant voltage, means for determining the phase of said first resultant voltage, means for combining the modulated voltage from the third detector unit with the output of the other of said two detector units to produce a second resultant voltage, and means for determining the phase of said second resultant voltage.

10. Apparatus for determining the direction of arrival in space of seismic waves which comprises, in combination, three seismometers having their axes of sensitivity oriented in three different directions in space, means for modulating an alternating carrier voltage of one phase with the output of one of said seismometers, means for modulating an alternating carrier voltage of different phase with the outputs of the other seismometers, means for combining the first modulated voltage with each of the other modulated voltages to produce two resultant voltages, and means for determining the phase of each of said resultant voltages.

11. Apparatus for determining the direction of arrival in space of seismic waves which comprises, in combination, three seismometers having their axes of sensitivity oriented in three different directions in space, means for modulating an alternating carrier voltage of one phase with the output of one of said seismometers, means for modulating an alternating carrier voltage of different phase with the outputs of the other seismometers, means for combining the first modulated voltage with each of the other modulated voltages to produce two resultant voltages, and means for determining the phase of each of said two resultant voltages with respect to the phase of one of said alternating carrier voltages.

12. Apparatus constructed in accordance with claim 11 in which the axes of sensitivity of the seismometers are oriented in three mutually perpendicular directions and in which there is a ninety degree phase difference between the first and second alternating carrier voltages.

RAYMOND G. PIETY.

REFERENCES CITED

The following references are of record in the file of this patent:

UNITED STATES PATENTS

| Number | Name | Date |
|---|---|---|
| 2,036,824 | Owen | Apr. 7, 1936 |
| 2,055,476 | Blau | Sept. 29, 1936 |
| 2,166,991 | Guanella | July 25, 1939 |
| 2,215,297 | Owen | Sept. 17, 1940 |